(12) United States Patent
Suzuki et al.

(10) Patent No.: US 7,007,173 B2
(45) Date of Patent: Feb. 28, 2006

(54) CONTENT DISTRIBUTION SYSTEM, COPYRIGHT PROTECTION SYSTEM AND CONTENT RECEIVING TERMINAL

(75) Inventors: Takashi Suzuki, Yokosuka (JP); Toshiro Kawahara, Tsuyama (JP); Minoru Etoh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 819 days.

(21) Appl. No.: 10/026,640

(22) Filed: Dec. 27, 2001

(65) Prior Publication Data
US 2002/0091925 A1    Jul. 11, 2002

(30) Foreign Application Priority Data
Dec. 28, 2000  (JP)  .............. 2000-402959

(51) Int. Cl.
*G06F 1/24*  (2006.01)
(52) U.S. Cl. ...................... 713/200; 713/201
(58) Field of Classification Search ................ 713/200, 713/201
See application file for complete search history.

(56) References Cited

U.S. PATENT DOCUMENTS 5,787,414 A * 7/1998 Miike et al. ................ 707/2
5,832,100 A * 11/1998 Lawton et al. ............. 382/100
6,009,401 A    12/1999 Horstmann

FOREIGN PATENT DOCUMENTS

| CN | 1249625 | 4/2000 |
|---|---|---|
| EP | 0 696 121 A1 | 2/1996 |
| EP | 0 715 243 A1 | 6/1996 |
| EP | 0 989 751 A2 | 3/2000 |
| EP | 1 014 618 A1 | 6/2000 |
| JP | 2000-36781 | 2/2000 |

* cited by examiner

*Primary Examiner*—Thomas R. Peeso
(74) *Attorney, Agent, or Firm*—Oblon, Spivak, McClelland, Maier & Neustadt, P.C.

(57) ABSTRACT

A content distribution system is provided in which the content distribution system includes at least a content distribution server, a computer system and a content receiving terminal, the computer system including: a part for generating a content selection document including content location information; and a part for sending the content selection document to the content receiving terminal; the content receiving terminal including: a part for receiving the content selection document from the computer system; an part for extracting the content location information from the content selection document; a part for sending a distribution request for the content to the content distribution server; and a part for receiving the content from the content distribution server.

18 Claims, 8 Drawing Sheets

CONTENT DISTRIBUTION SYSTEM, COPYRIGHT PROTECTION SYSTEM AND CONTENT RECEIVING TERMINAL

BACKGROUND OF THE INVENTION

1. Field of the Invention

The present invention relates to a system for protecting copyright of content which is a work. More particularly, the present invention relates to a work protection technology in a content distribution system which distributes content which is a work.

2. Description of the Related Art

In recent years, as high speed access lines become widespread and internet technologies develop, content distribution services are being realized in which content such as images and music are distributed via the Internet. In order to popularize the content distribution services, it is indispensable that a proper consideration is paid to an owner of the content. For this purpose, a system which bills a user of the content becomes necessary.

For example, Japanese laid-open patent application No.2000-101573 discloses a content distribution system which bills a user according to usage of content. In the content distribution system disclosed in the Japanese laid-open patent application No.2000-101573, a server performs a content distribution process according to a request from a content receiving terminal, and the server performs a billing process for content usage.

In a large-scale content distribution system which is used by many users, when user authentication, billing process and content distribution process are performed by the same server, load for performing these processes becomes too large so that there occurs a problem in that the number of users to which content can be simultaneously distributed is decreased.

Therefore, it becomes necessary that the user authentication, the billing process and the content distribution process are performed by respective servers in order to realize load distribution. In addition, by realizing load distribution, it becomes possible that billing for the content owner and billing for the content user can be performed by different billing operators respectively so that various content distribution services become available.

SUMMARY OF THE INVENTION

An object of the present invention is to provide a content distribution system, a copyright protection system and a content receiving terminal which can allow constructing a large-scale system and performing proper billing.

The above object is achieved by a content distribution system including at least a content distribution server which stores and distribute content, a computer system and a content receiving terminal which receives the content from the content distribution server, the computer system including:

a content selection document generation part for generating a content selection document including content location information indicating a location of the content; and a content selection document sending part for sending the content selection document to the content receiving terminal;

the content receiving terminal including:

a content selection document receiving part for receiving the content selection document from the computer system;

an information extracting part for extracting the content location information from the content selection document;

a distribution request sending part for sending a distribution request for the content to the content distribution server; and a content receiving part for receiving the content from the content distribution server according to the distribution request.

In this invention, the computer system may be a copyright protection system in the after-mentioned embodiment. According to the invention, the content distribution server and the copyright protection system can be separated, and information is not exchanged between the content distribution server and the copyright protection system when the content are distributed. Therefore, load of the content distribution server is decreased and a large-scale content distribution system can be constructed.

In the content distribution system, the computer system may further includes an encryption part for encrypting the content location information selectively, and the content receiving terminal may further includes a decoding part for decoding the content location information which is encrypted.

Accordingly, since the whole of the content selection document is not encrypted and only the content location information can be selectively encrypted, efficient content billing can be performed by including a plurality of items of encrypted content location information in the content selection document according to billing types.

In the content distribution system the content selection document generation part generates the content selection document including the content location information and location authentication information for verifying validity of the location of the content;

the information extracting part extracts the content location information and the location authentication information from the content selection document; and the content receiving terminal further includes a validity verifying part for verifying validity of the location of the content on the basis of the location authentication information, and the distribution request sending part sends the distribution request when the location is verified to be valid.

According to the invention, since the location authentication information is sent to the content receiving terminal, the content receiving terminal can verify validity of the location of the content indicated by the content location information. Therefore, it can be prevented that the content receiving terminal accesses an invalid server for receiving illegal content so that the billing process can be performed appropriately.

In the content distribution system, the computer system may further includes an encryption part for encrypting the content location information, and the content receiving terminal further including a decoding part for decoding the content location information which is encrypted.

In addition, in the content distribution system, the encryption part may encrypt the content location information and the location authentication information into encrypted data;

the content selection document generation part generates the content selection document including the encrypted data;

the information extracting part extracts the encrypted data from the content selection document; and the decoding part decodes the content location information and the location authentication information.

The above object can be also achieved by a computer system used in a content distribution system including at least a content distribution server which stores and distributes content, the computer system and a content receiving terminal which receives the content from the content distribution server, the computer system including:

a content selection document generation part for generating a content selection document including content location information indicating a location of the content; and a content selection document sending part for sending the content selection document to the content receiving terminal.

The computer system may include an encryption part for encrypting the content location information.

In the computer system, the content selection document generation part may generate the content selection document including the content location information and location authentication information for verifying validity of the location of the content.

The computer system may further includes:

an information obtaining part for obtaining content information including the content location information, and access information relating to the content information;

an encryption method selection part for selecting an encryption method for the content location information on the basis of the access information;

wherein the encryption part encrypts the contents location information by using a selected encryption method.

In addition, the computer system may further includes an information obtaining part for obtaining content information including the content location information, access information relating to the content information, and location authentication information for verifying validity of a location of content specified by the content location information;

wherein the content selection document generation part generates the content selection document including obtained location authentication information.

the computer system may further includes:

a key sharing part for sharing a key used for encrypting the content location information with the content receiving terminal; and a billing part for billing a usage fee of the content specified by the content location information according to a key sharing history.

The above object can be also achieved by a content receiving terminal in a content distribution system including at least a content distribution server which stores and distribute content, a computer system and the content receiving terminal, the content receiving terminal including:

a content selection document receiving part for receiving content selection document including content location information from the computer system;

an information extracting part for extracting the content location information from the content selection document;

a distribution request sending part for sending a distribution request for the content specified by the content location information to the content distribution server; and a content receiving part for receiving the content from the content distribution server according to the distribution request.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
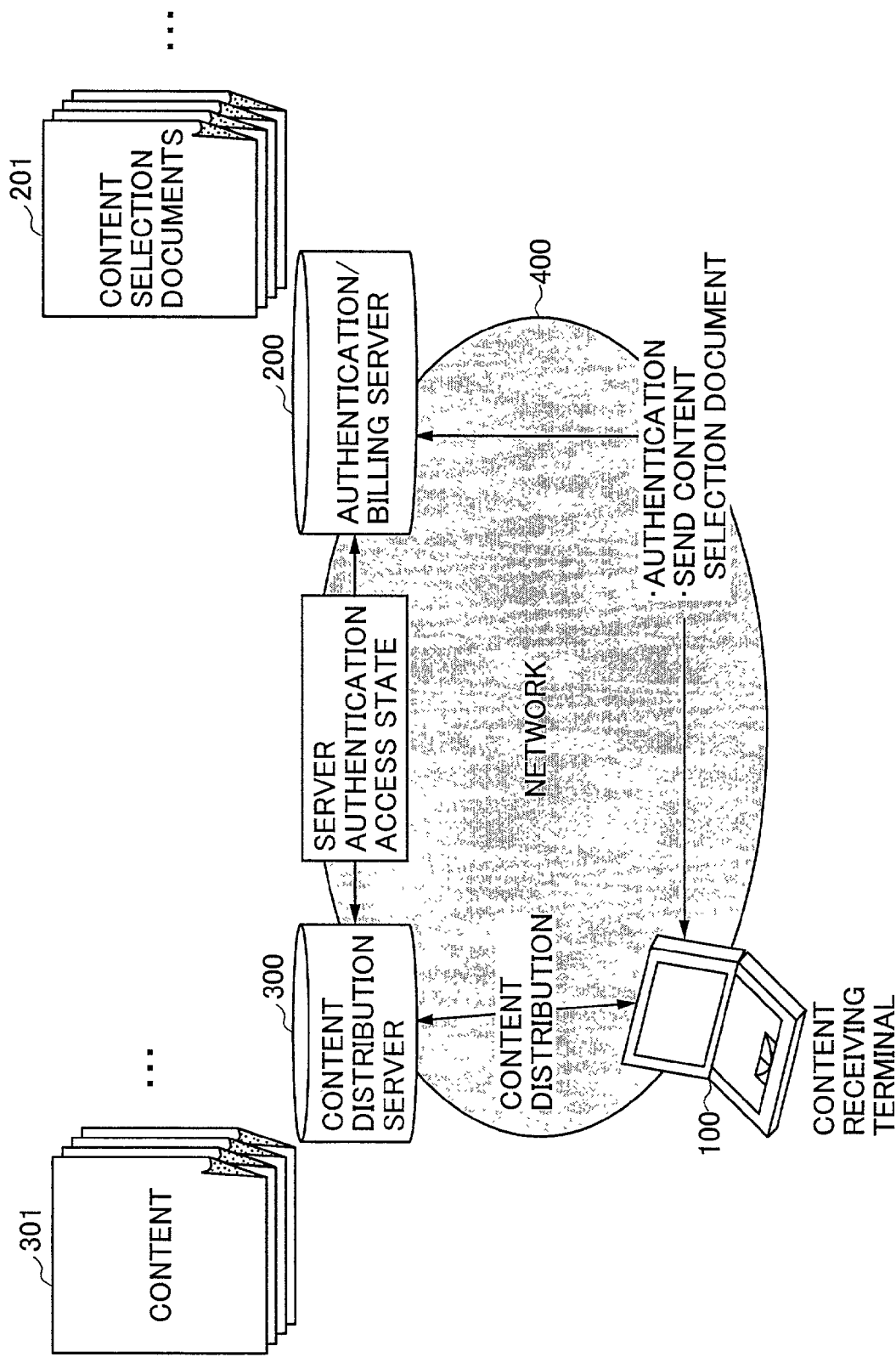
FIG. 1 is a figure showing a provisional content distribution system.

FIG. 1 shows a provisional content distribution system in which load distribution is designed by separating a content distribution server and an authentication/billing server. This figure is for explaining analysis of conventional technology in terms of the present invention. In FIG. 1, an authentication/billing server 200 stores content selection documents 201 which include link information to content. The content selection documents 201 are documents of HTML format for example. When the content represented by the link information is chargeable, the whole of the content selection document is encrypted. When the content is not chargeable, the content selection document is not encrypted. Then, the content selection document is sent to a content receiving terminal 100.

In the Japanese laid-open patent application No.2000-101573; if the authentication/billing server and the content distribution server are separated in the content distribution system, it is necessary to prepare content selection documents for each billing type of the content in order to perform billing for content of each user. That is, an unencrypted content selection document needs to be distributed to a user who wants free content, and an unencrypted content selection document and an encrypted content selection document need to be distributed to a user who wants both of free content and chargeable content. Therefore, the system is not very efficient.

In addition, if the authentication/billing server and the content distribution server are separated in the content distribution system disclosed in the Japanese laid-open patent application No.2000-101573, it may become a problem that an authentication mechanism for the content distribution server is not provided. For example, when link information indicating an invalid content server is embedded in the content selection document, it results in that the content receiving terminal requests the invalid server to send content so that content which are illegally copied are distributed. Therefore, a problem may arise in that proper billing becomes difficult.

In addition, if an authentication mechanism for the content distribution server is provided in the authentication/billing server as shown in FIG. 1, information used for server authentication and the like is exchanged between the content distribution server and the authentication/billing server. Therefore, there is a problem in that load of the content distribution server becomes high.

Figure 2:
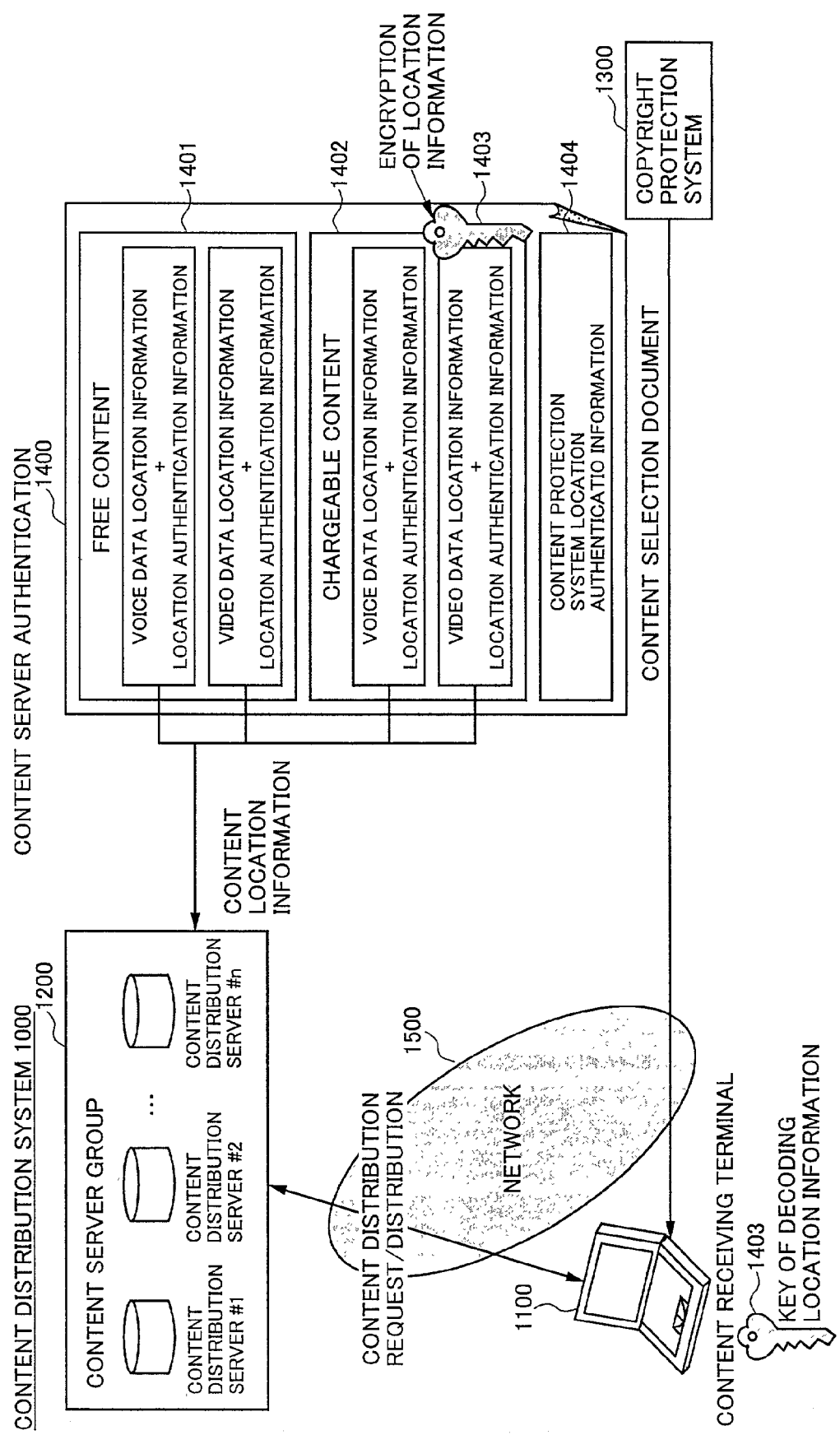
FIG. 2 shows a configuration example of a content distribution system according to a first embodiment of the present invention.

In the following, embodiments of the present invention will be described with reference to figures. FIG. 2 shows a configuration example of a content distribution system according to a first embodiment of the present invention. The content distribution system 1000 shown in FIG. 2 includes a content receiving terminal 1100, a content server group 1200 and a copyright protection system 1300. Each of the content server group 1200 and the copyright protection system 1300 are connected to the content receiving terminal 1100 via a network 1500.

In the content distribution system 1000, the copyright protection system 1300 encrypts and sends content location information which represents a location of content which is, for example, audiovisual data. The content receiving terminal 1100 receives the encrypted content location information and decodes the encrypted content location information only when the terminal 1100 has a decoding key so that the terminal can receive content by accessing the content server group 1200. In addition, in the content distribution system 1000, the copyright protection system 1300 has and sends location authentication information for authenticating validity of location of content. The content receiving terminal 1100 receives the location authentication information and can verify the validity of the location of the content.

Figure 3:
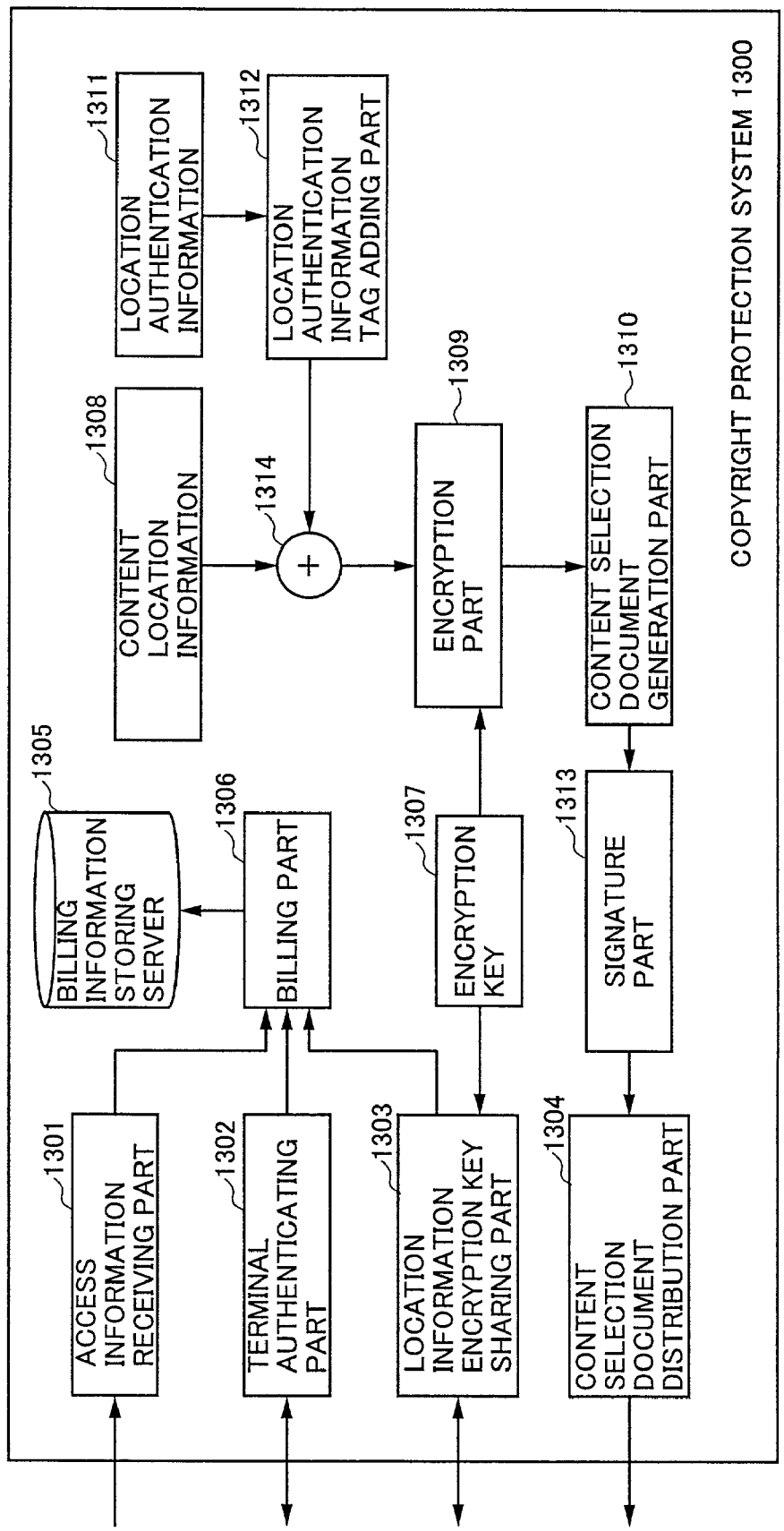
FIG. 3 shows a configuration example of a copyright protection system according to the first embodiment of the present invention.

The copyright protection system 1300 has a function of generating a content selection document 1400 and sending it to the content receiving terminal 1100. FIG. 3 shows a configuration example of the copyright protection system 1300 according to the first embodiment of the present invention.

When the content receiving terminal 1100 receives content, the content receiving terminal 1100 accesses the copyright protection system 1300 according to a user's operation. At this time, a terminal authenticating part 1302 authenticates the content receiving terminal 1100 or the user of the content receiving terminal 1100. For the authentication, for example, an authentication method by using an ID and a password which are provided to the content receiving terminal 1100 or to the user of the content receiving terminal 1100 can be used.

Location authentication information for verifying validity of a content distribution server 1311 is added to the content location information 1308 which is generated in the copyright protection system 1300 or which is input from outside. At this time, a tag which indicating the location authentication information is added by a location authentication information tag adding part 1312. An issuer of the location authentication information can be the copyright protection system 1300, an operator of the content distribution server, a content holder or the like. However, the copyright protection system 1300 is the issuer in this embodiment.

A method of digital signature and the like to which a public key system is applied can be used for generating or verifying location authentication information 1311. In this case, an one-way function is operated on the content location information 1308, and the results of the operation is encrypted by using a secret key of the public key system so that the location authentication information 1311 is obtained. When verifying the content location information 1308, the one-way function is operated on received content location information and the result is compared with received location authentication information 1311 which is decoded by a public key corresponding to the secret key. Then, it is judged to be valid when they are the same and it is judged to be invalid when they are not the same. "Encryption and information security", Tujii and Kasahara, pp. 130–147, for example, can be referred to for details of the digital signature.

A location authentication information tag adding part 1312 adds a tag (which will be called location authentication information tag) indicating location authentication information to the location authentication information 1311. An information adding part 1314 adds the location authentication information 1311 and the location authentication information tag which are output from the location authentication information tag adding part 1312 to the content location information 1308.

An encryption part 1309 encrypts the content location information 1308 output from the information adding part 1314 by using an encryption key 1307 corresponding to the billing type of content in which the location authentication information 1311 is added to the content location information 1308. In addition, the encryption part 1309 adds a tag (which will be called an encrypted information tag) representing that the content location information is encrypted to the encrypted content location information.

DES, TDES and the like can be used for encrypting the content location information. The encryption key used for encryption is shared with the content receiving terminal by a location information encryption key sharing part 1303. For sharing the encryption key 1307, a key distribution algorithm of Deffie-Hellman ("Information Security Theory", Imai, et al., pp.132–135) and the like can be used. The location information encryption sharing part 1303 records sharing history of the encryption key 1307 which is shared with the content receiving terminal 1100, and the location information encryption sharing part 1303 provides the sharing history to a billing part 1306.

A content selection document generation part 1310 generates the content selection document by combining a plurality of items of content location information 1308 which are encrypted. A signature part 1313 adds a signature corresponding to the copyright protection system 1300 to the generated content selection document for proving validity of the copyright protection system 1300 which is a source of the content selection document. A content selection document distribution part 1304 sends the content selection document to which the signature is added to the content receiving terminal 1100 which is authenticated by the terminal authentication part 1302.

In FIG. 2, the content selection document distributed to the content receiving terminal 1100 is configured like a content selection document 1400 shown in FIG. 2 for example. The content selection document 1400 includes an information group 1401 including content location information and location authentication information corresponding to music data and video data which are free content, an information group 1402 including content location information and location authentication information corresponding to music data and video data which are chargeable content, and a signature (content selection document signature) which verifies a source of the content selection document 1400. In the content selection document 1400, the content location information corresponding to the music data and the video data which are free content are not encrypted such that unspecified content receiving terminals can receive the free content. Only the content location information corresponding to the chargeable content is encrypted. Although the encrypted information tag and the location authentication information tag are included in the content selection document 1400 in addition to the content location information and the location authentication information, they are not shown in FIG. 2.

The billing part 1306 recognizes, on the basis of the key sharing history provided from the location information encryption key sharing part 1303, the encryption key 1307 used for encrypting the content location information in the content selection document which is sent to the content receiving terminal 1100. Then, the billing part 1306 performs billing for a user of the content receiving terminal, that is, for a content user according to the billing type corresponding to the key 1307. The billing part 1306 uses identifying information of the content receiving terminal 1100 or the user which is provided from the terminal authentication part 1302 for specifying the content user. As the identifying information, an ID provided to the content receiving terminal or to the user of the content receiving terminal can be used in which the ID is used for performing authentication of the content receiving terminal by the terminal authentication part 1302.

In addition to the key sharing history, the billing part 1306 can also use a distribution history in which each content server in the content server group 1200 distributed content to the content receiving terminal 1100. In this case, an access information receiving part 1301 receives the distribution histories from the content distribution servers in the content server group 1200. The billing part 1306 performs billing for the users of the content receiving terminals on the basis of the received distribution histories.

Results of the billing process performed by the billing part 1306 are stored in a billing information storing server 1305 as billing information.

By choosing the sharing history of the encryption key 1307 or the distribution history of the content for performing billing, it becomes possible to realize various billing forms. For example, by using the sharing history of the encryption key 1307, a fixed-price service which allows distribution of content over and over once a fee is paid can be realized. In addition, by providing a term of validity to the content location information by using symbolic links and the like, a fixed-price service of limited-time can be realized in which the user can receive the content without limit on the number of times during the term. On the other hand, when the distribution history of the content is used, a so-called pay per view service can be realized in which billing is performed each time when the content distribution occurs.

Figure 4:
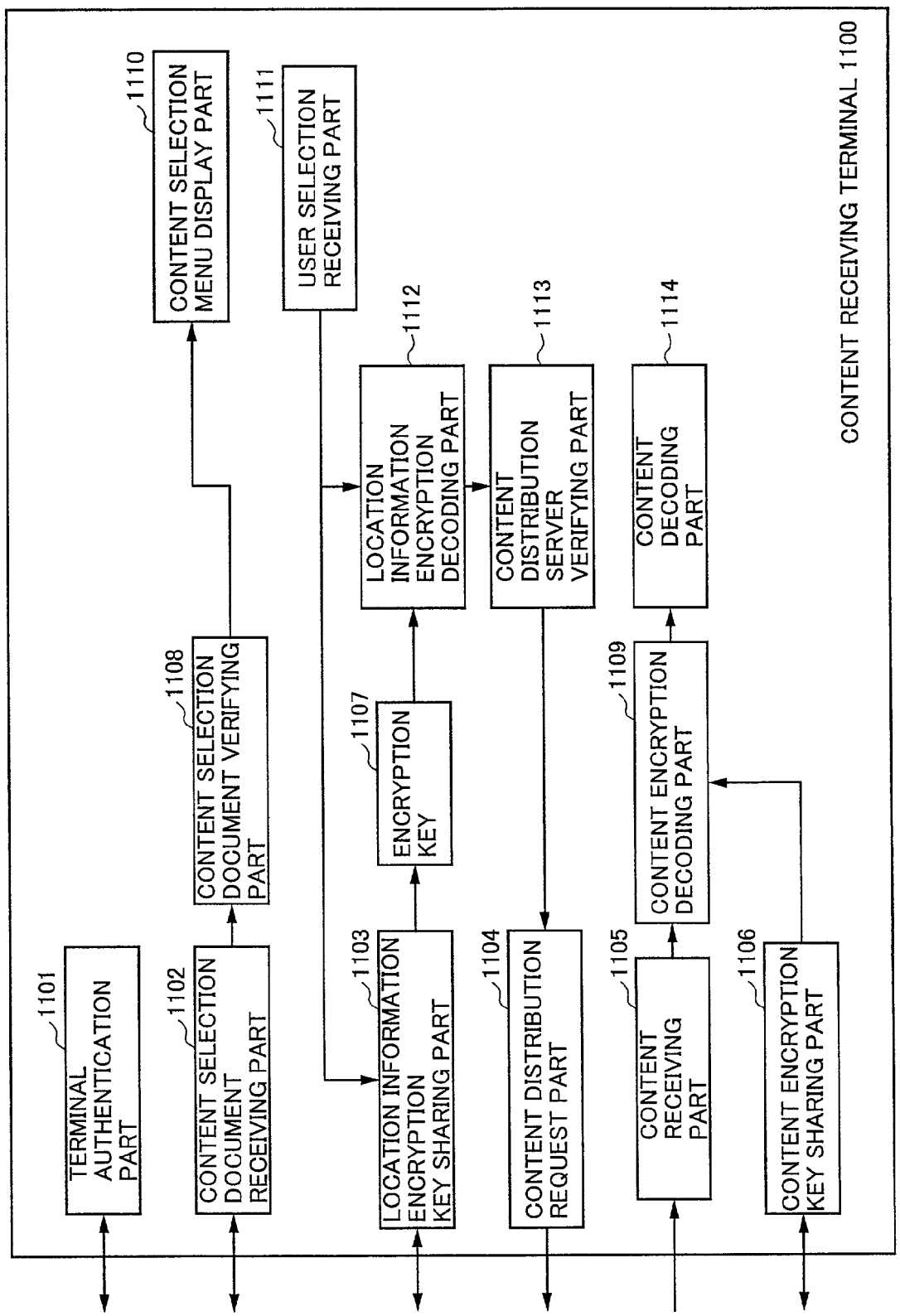
FIG. 4 shows a configuration example of a content receiving terminal according to the first embodiment of the present invention.

FIG. 4 shows a block diagram showing a configuration example of the content receiving terminal 1100 according to a first embodiment. When receiving content, a terminal authentication part 1101 performs an authentication process with the terminal authenticating part 1302 by sending information necessary for performing authentication to the terminal authentication part 1302, in which the information is, for example, an ID and a password provided to the content receiving terminal 1100 or to the user of the content receiving terminal.

After the authentication process is performed, the content selection document 1400 is sent from the content selection document distribution part 1304 in the copyright protection system 1300. A content selection document receiving part 1102 receives the content selection document 1400. A content selection document verifying part 1108 verifies validity of the content selection document 1400 by verifying the signature included in the content selection document 1400. When the validity is verified, the content selection document verifying part 1108 outputs the content selection document 1400 to a content selection menu display part 1110. The content selection menu display part 1110 displays a screen (content selection screen) for a user of the content receiving terminal 1100 to select the content.

The user of the content receiving terminal 1100 selects content which the user wants. The result of selection is received by a user selection receiving part 1111. A location information encryption decoding part 1112 extracts content location information and location authentication information corresponding to the content selected by the user from the received content selection document 1400. The location information encryption decoding part 1112 judges whether the extracted content location information and the location authentication information are encrypted on the basis of the encrypted information tag. When they are encrypted, the location information encryption decoding part 1112 decodes the encrypted content location information and the location authentication information by using a key shared with the copyright protection system 1300 by a location information encryption key sharing part 1103.

A content distribution server verifying part 1113 extracts location authentication information from the received content selection document 1400 on the basis of the location authentication information tag. Next, the content distribution server verifying part 1113 verifies validity of location of content, that is, validity of the content distribution server on the basis of the location authentication information. Only when it is judged that the content distribution server is valid, the content distribution server verifying part 1113 outputs the content location information to a content distribution request part 1104. The content distribution request part 1104 sends a distribution request for the content to the content distribution server having the content specified by the content location information.

When the content is distributed from the content distribution server according to the distribution request, a content receiving part 1105 receives the content. A content decoding part 1114 decodes coded music data and/or video data which form the content. Then, the content decoding part 1114 outputs a voice signal or a video signal to an corresponding output device (not shown in the figure). If the received content is encrypted, the content encryption decoding part 1109 decodes the encrypted content by using a key shared with the content distribution server by the content encryption key sharing part 1106, and outputs the content to the content decoding part 1114.

By implementing the terminal authentication part 1101, the content selection document receiving part 1102, the location information encryption key sharing part 1103, the content distribution request part 1104, the content encryption key sharing part 1106, the content encryption decoding part 1109, the location information encryption decoding part 1112, the content distribution server verifying part 1113 and the content decoding part 1114 by software or hardware having tamper-proof ability, illegal operation by a user can be prevented. In addition, according to the tamper-proof ability, leakage of the content location information to the outside including a user of the content receiving terminal 1100 can be prevented.

According to the content distribution system of the present embodiment, the encryption part 1309 in the copyright protection system 1300 encrypts the content location information and the location authentication information, the content document generation part 1310 generates the content selection document in which a plurality of items of encrypted content location information and location authentication information are combined, and the content selection document distribution part 1304 sends the generated content selection document to the content receiving terminal 1100. On the other hand, the content selection document receiving part 1102 of the content receiving terminal 1100 receives the content selection document from the copyright protection system 1300, the location information encryption decoding part 1112 extracts encrypted content location information from the content selection document and decodes the encrypted content location information, the content distribution server verifying part 1113 verifies validity of location of the content by extracting the location authentication information from the received content selection document, the content distribution request part 1104 sends a distribution request for the content if the validity is verified, and the content receiving part 1106 receives the content distributed from the content server according the distribution request.

In the system, the content distribution server and the copyright protection system 1300 are separated, and, information is not exchanged between the content distribution server and the copyright protection system 1300 when the content is distributed. Therefore, load of the content distribution server is decreased and a large-scale content distribution system can be constructed.

In addition, unlike conventional way, the whole of the content selection document is not encrypted. Since only the content location information is selectively encrypted, efficient content billing can be performed by including a plurality of items of encrypted content location information in the content selection document according to billing types.

In addition, by encrypting the content location information, it can be prevented that a third party uses the content. Different from the conventional technology, it is not always necessary that the content is encrypted in the content distribution server. Therefore, the content receiving terminal 1100 can omit a decoding process for the encrypted content so that computing amount can be decreased.

In addition, since the copyright protection system 1300 sends the location authentication information for verifying validity of location of the content to the content receiving terminal 1100, the content receiving terminal 1100 can verify validity of the location of the content. Therefore, it can be prevented that the content receiving terminal accesses an invalid server for receiving illegal content so that the billing process can be performed appropriately.

Figure 5:
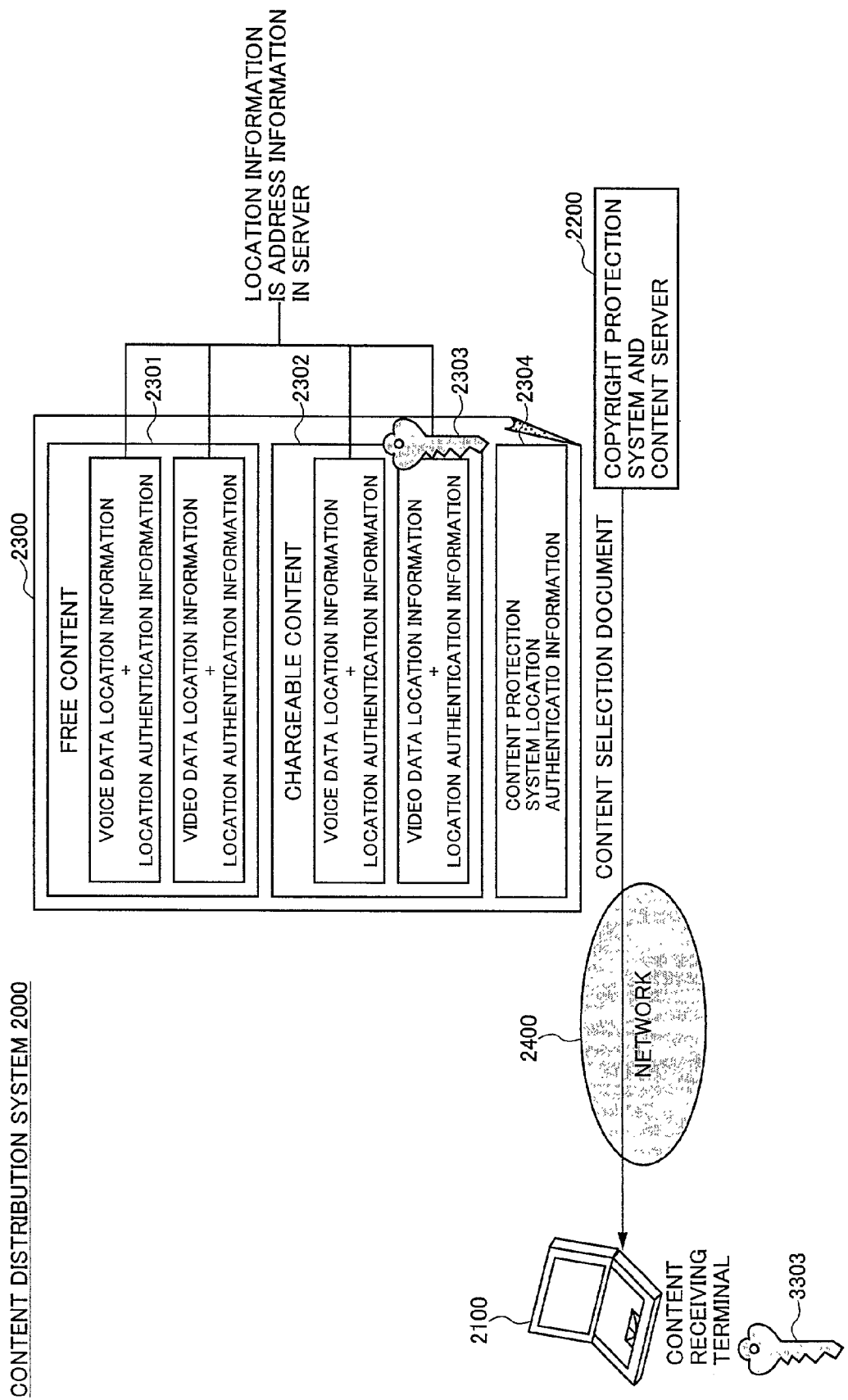
FIG. 5 shows a configuration example of a content distribution system according to a second embodiment of the present invention.

FIG. 5 is a block diagram showing a configuration example of a content distribution system according to a second embodiment of the present invention. The content distribution system 2000 shown in FIG. 5 includes a content receiving terminal 2100 and a copyright protection system and content distribution server 2200, in which the copyright protection system and content distribution server 2200 is configured such that a copyright protection system and a content distribution server are implemented in a server. The content receiving terminal 2100 and the copyright protection system and content distribution server 2200 are connected via a network 2400.

Like the copyright protection system 1300 of the first embodiment shown in FIG. 2, the copyright protection system and content distribution server 2200 encrypts the content location information which represents location of content which is, for example, audiovisual data. Then, the copyright protection system and content distribution server 2200 generates a content selection document 2300 which includes encrypted content location information, location authentication information for verifying validity of location of content, and a signature for verifying validity of the copyright protection system and content distribution server 2200. Then, the server 2200 sends the content selection document 2300 to the receiving terminal 2100.

Like the content receiving terminal 1100 in the first embodiment shown in FIG. 2, the content receiving terminal 2100 verifies the signature in the content selection document 2300, decodes content location information corresponding to content which is selected by the user, and verifies validity of location of the content. Then, the content receiving terminal 2100 sends a distribution request of the content specified by the content location information to the copyright protection system and content distribution server 2200, and receives the content distributed according to the distribution request.

As mentioned above, the copyright protection system and the content distribution server can be implemented in a server. In this case, the content location information may be address information or directory information in the server.

Figure 6:
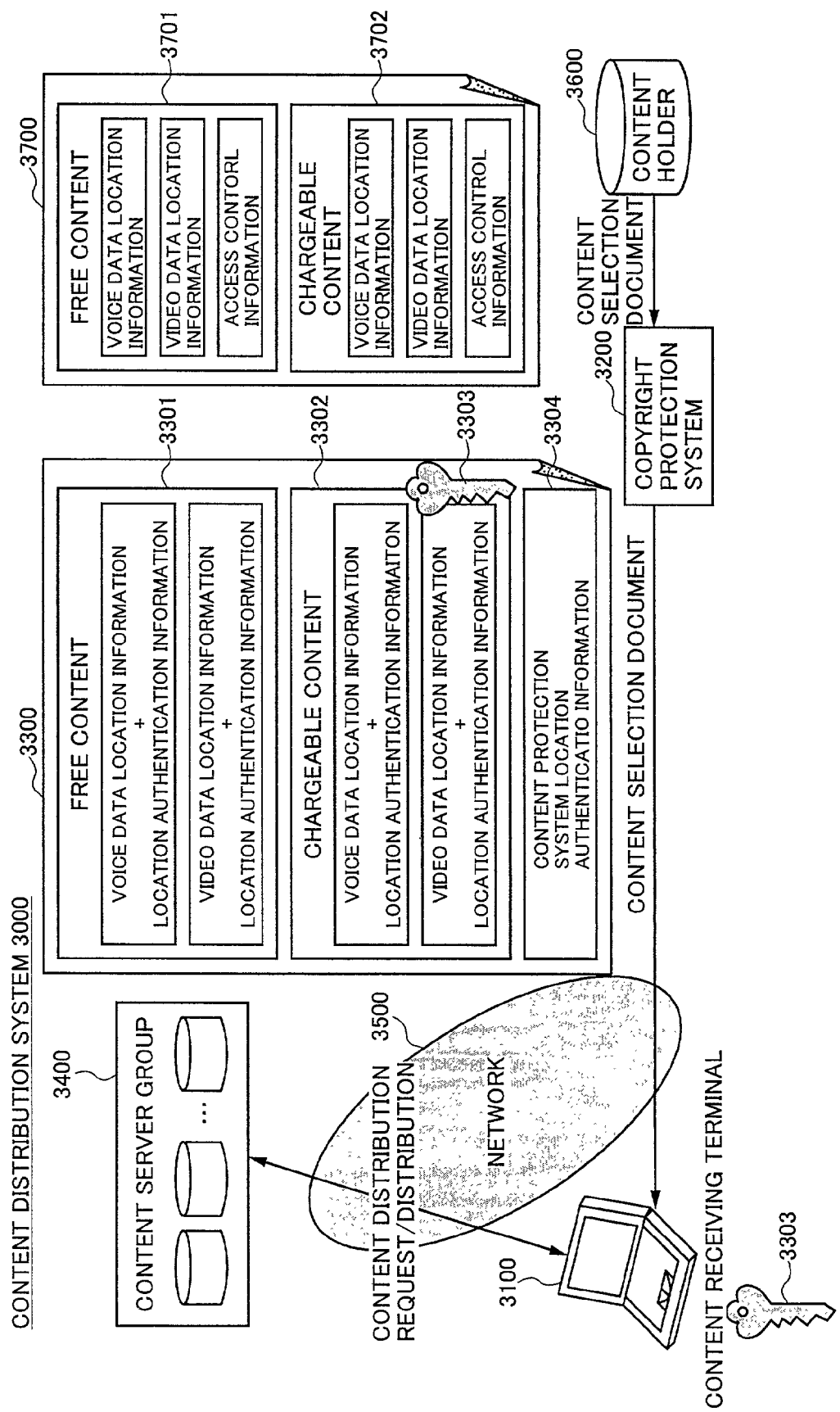
FIG. 6 shows a configuration example of a content distribution system according to a third embodiment of the present invention.

FIG. 6 is a block diagram showing a content distribution system according to a third embodiment of the present invention. The content distribution system 3000 shown in the figure includes a content receiving terminal 3100, a copyright protection system 3200, a content server group 3400 and a content holder 3600. The copyright protection system 3200 and the content distribution server 3400 are connected to the content receiving terminal 3100 via a network 3500.

The content holder 3600 generates a content selection document 3700 which includes content location information indicating location of content which is audiovisual data and access control information (billing information and the like) which relates to the content, and the content holder 3600 sends these generated information to the copyright protection system 3200.

The copyright protection system 3200 converts the received content selection document 3700 to a content selection document 3300 suitable for sending to the content receiving terminal 3100. At this time, the copyright protection system 3200 provides location authentication information for verifying validity of location of content, encrypts content location information on the basis of the access information and provides a signature for verifying validity of the copyright protection system 3200 which is a source of the content selection document. The location authentication information can be issued by the content holder or a content server operator instead of the copyright protection system 3200.

Like the content receiving terminal 3100 in the first embodiment shown in FIG. 2, the content receiving terminal 3100 verifies the signature included in the content selection document 3300, decodes the content location information corresponding to content which is selected by the user, and verifies validity of location of content. Then, the content receiving terminal 3100 sends a distribution request of the content specified by the content location information to the content distribution server, and receives the content distributed according to this distribution request.

Although the copyright protection system encrypts both of the content location information and the location authentication information in the above-mentioned first to third embodiments, only the content location information may be encrypted.

As mentioned above, it is necessary to embed the location authentication information for verifying validity of location of content and the encrypted content location information in the content selection document. For embedding the location authentication information and the encrypted content location information, XMK (eXtensible Markup Language)

which is becoming popular as a description language of data exchanged on the Internet can be used.

XML is a general data description language by which a user can define tags freely. Thus, the tag (location authentication information tag) indicating the location authentication information and the tag (encrypted information tag) indicating that content location information is encrypted can be defined in XML. In W3C, standardization of XML-signature which can provide a signature to a part of a document is being carried out. The XML-signature is a standard for representing information on signature by using an XML document by using tags. In addition, signature information can be embedded in a document of html or XML by using a text format according to the standard. Accordingly, it becomes possible to use XML for embedding the location authentication information and the encrypted content location information in the content selection document.

Figure 7:
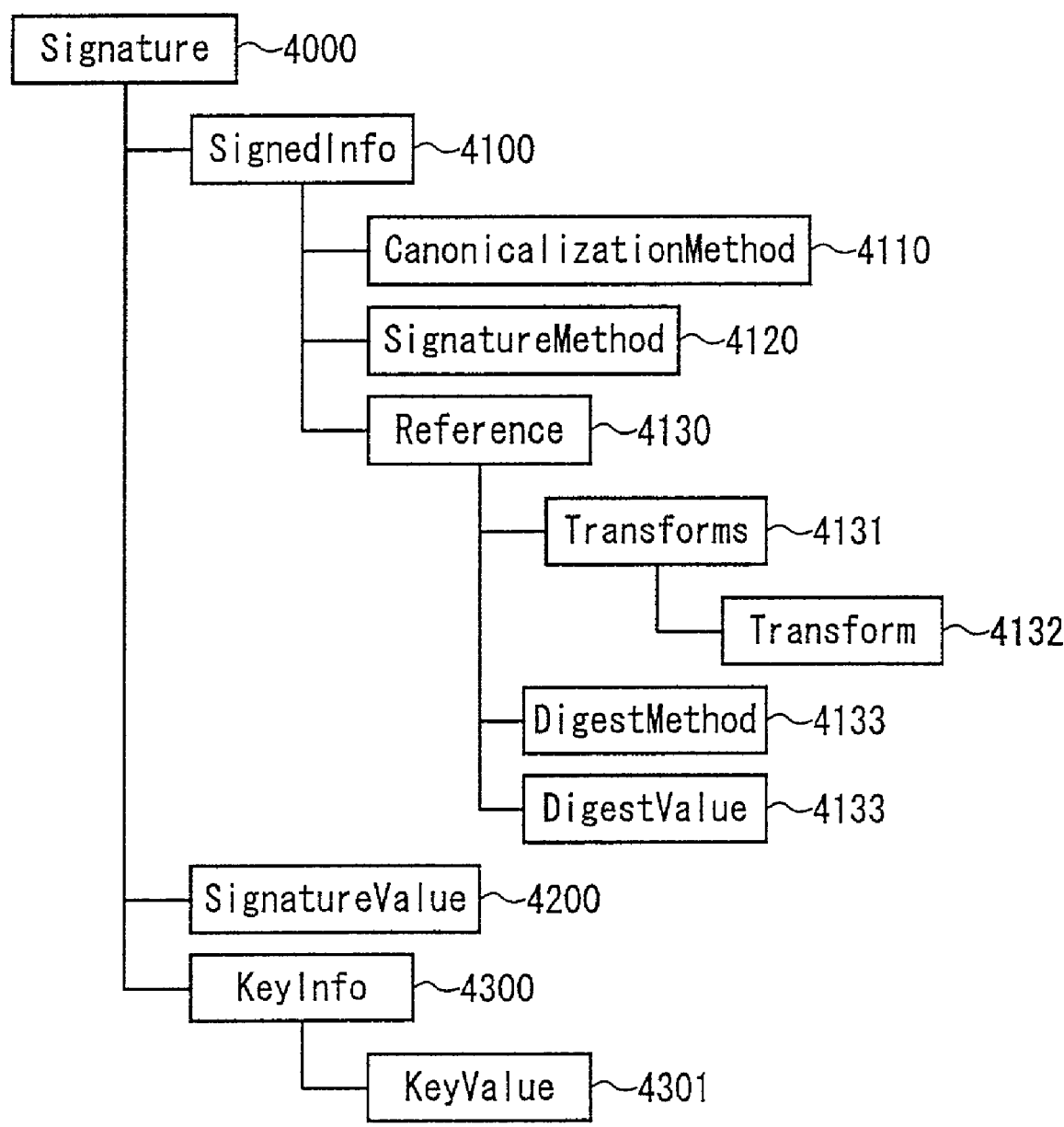
FIG. 7 shows a structure of XML-signature.

FIG. 7 shows a structure of the XML-signature. As shown in FIG. 7, the XML-signature begins with a Signature element 4000. The Signature element 4000 includes a SignedInfo element 4100, a SignatureValue element 4200, a KeyInfo element 4300. The SignedInfo element 4100 includes an algorithm used for providing signature, URIs of signed subjects and hash values of signed subjects. The SignatureValue element 4200 is a signature value for the SignedInfo element 4100, and used for verifying whether the SignedInfo element 4100 is not tampered. The KeyInfo element 4300 is key data for verifying the signature value.

When the XML-signature is used for embedding the location authentication information for verifying validity of location of content, a URI of authentication information for the content distribution server generated by an authentication station or by the copyright protection system is embedded in the Reference element 4130, and authentication information generated by the authentication information is embedded in the SignatureValue element 4200. In addition, the algorithm used for generating the authentication information is embedded into the SignedInfo element 4100, and a key for verifying the authentication information and a sharing method of the key are embedded in the KeyInfo element 4300.

Figure 8:
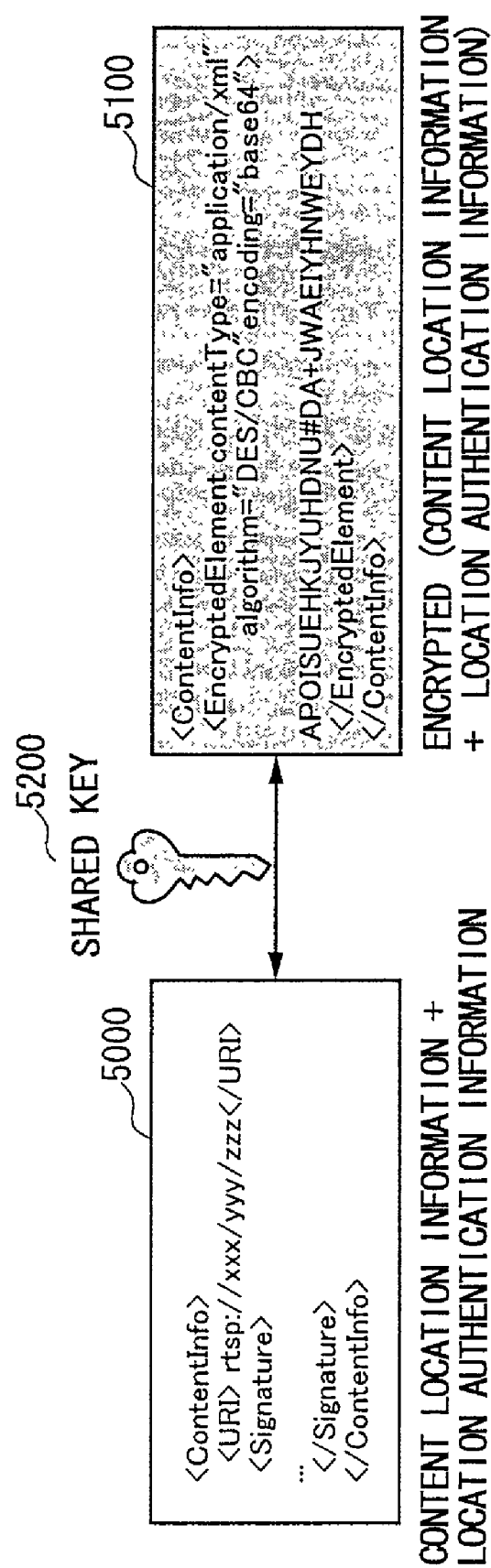
FIG. 8 shows an example of a procedure of Element-Wise XML Encryption.

When embedding the encrypted content location information in the content selection document, Element-Wise XML Encryption (refer to http://lists.w3.org/Archives/Public/xml-encryption/2000Apr/att-0005/01-xmlenc) which is proposed by Murayama in IBM Tokyo Research Laboratory can be used. This enables to perform encryption on element by element in the XML document. As shown in FIG. 8, a cryptogram and the algorithm used for the encryption can be embedded in an encrypted element.

As mentioned above, according to the present invention, the content distribution server and the copyright protection system are separated, and, information is not exchanged between the content distribution server and the copyright protection system when the content are distributed. Therefore, load of the content distribution server is decreased and a large-scale content distribution system can be constructed.

In addition, the whole of the content selection document is not encrypted. Since only the content location information is selectively encrypted, efficient content billing can be performed by including a plurality of items of encrypted content location information in the content selection document according to billing types.

In addition, since the copyright protection system sends the location authentication information for verifying validity of location of the content to the content receiving terminal, the content receiving terminal can verify validity of the location of the content indicated by the content location information. Therefore, it can be prevented that the content receiving terminal accesses an invalid server for receiving illegal content so that the billing process can be performed appropriately.

Especially, the copyright protection system can encrypt the content location information appropriately by providing the access control information of content such as the billing type to the content selection document.

The present invention is not limited to the specifically disclosed embodiments, and variations and modifications may be made without departing from the scope of the invention.

What is claimed is:

1. A content distribution system comprising:
at least a content distribution server which stores and distributes content, a computer system and a content receiving terminal which receives said content from said content distribution server, said computer system including
a content selection document generation part for generating a content selection document including content location information indicating a location of said content, and
a content selection document sending part for sending said content selection document to said content receiving terminal;
said content receiving terminal including
a content selection document receiving part for receiving said content selection document from said computer system,
an information extracting part for extracting said content location information from said content selection document,
a distribution request sending part for sending a distribution request for said content to said content distribution server, and
a content receiving part for receiving said content from said content distribution server according to said distribution request.

2. The content distribution system as claimed in claim 1, said computer system further comprising an encryption part for encrypting said content location information selectively, and said content receiving terminal further comprising a decoding part for decoding said content location information which is encrypted.

3. A content distribution system comprising:
at least a content distribution server which stores and distributes content, a computer system and a content receiving terminal which receives said content from said content distribution server, said computer system including
a content selection document generation part for generating a content selection document including content location information indicating a location of said content, and
a content selection document sending part for sending said content selection document to said content receiving terminal;
said content receiving terminal including
a content selection document receiving part for receiving said content selection document from said computer system,
an information extracting part for extracting said content location information from said content selection document, a distribution request sending part for sending a distribution request for said content to said content distribution server, and a content receiving part for receiving said content from said content distribution server according to said distribution request wherein:

said content selection document generation part generates said content selection document including said content location information and location authentication information for verifying validity of said location of said content;

said information extracting part extracts said content location information and said location authentication information from said content selection document; and said content receiving terminal further comprises a validity verifying part for verifying validity of said location of said content on the basis of said location authentication information, and said distribution request sending part sends said distribution request when said location is verified to be valid.

4. The content distribution system as claimed in claim 3, said computer system further comprising an encryption part for encrypting said content location information selectively, and said content receiving terminal further comprising a decoding part for decoding said content location information which is encrypted.

5. The content distribution system as claimed in claim 4, wherein: said encryption part encrypts said content location information and said location authentication information into encrypted data; said content selection document generation part generates said content selection document including said encrypted data; said information extracting part extracts said encrypted data from said content selection document; and said decoding part decodes said content location information and said location authentication information.

6. A computer system used in a content distribution system comprising:
- at least a content distribution server which stores and distributes content;
- a computer system; and
- a content receiving terminal which receives said content from said content distribution server, wherein said computer system including
- a content selection document generation part for generating a content selection document including content location information indicating a location of said contents, and
- a content selection document sending part for sending said content selection document to said content receiving terminal.

7. The computer system as claimed in claim 6, further comprising an encryption part for encrypting said content location information selectively.

8. A computer system, comprising:
- at least a content distribution server which stores and distributes content;
- a computer system; and
- a content receiving terminal which receives said content from said content distribution server, wherein said computer system including
- a content selection document generation part for generating a content selection document including content location information indicating a location of said contents; and
- a content selection document sending part for sending said content selection document to said content receiving terminal wherein said content selection document generation part generates said content selection document including said content location information and location authentication information for verifying validity of said location of said content.

9. The computer system as claimed in claim 8, said computer system further comprising an encryption part for encrypting said content location information selectively.

10. The computer system as claimed in claim 9, wherein: said encryption part encrypts said content location information and said location authentication information into encrypted data; said content selection document generation part generates said content selection document including said encrypted data.

11. The computer system as claimed in claim 8, said computer system further comprising an information obtaining part for obtaining content information including said content location information, access information relating to said content information, and location authentication information for verifying validity of a location of content specified by said content location information; wherein said content selection document generation part generates said content selection document including obtained location authentication information.

12. A computer system comprising:
- at least a content distribution server which stores and distributes content;
- a computer system; and
- a content receiving terminal which receives said content from said content distribution server, wherein said computer system including
- a content selection document generation part for generating a content selection document including content location information indicating a location of said contents, and
- a content selection document sending part for sending said content selection document to said content receiving terminal further comprising an encryption part for encrypting said content location information selectively, and further comprising:
- an information obtaining part for obtaining content information including said content location information, and access information relating to said content information;
- an encryption method selection part for selecting an encryption method for said content location information on the basis of said access information; wherein
- said encryption part encrypts said contents location information by using a selected encryption method.

13. A computer system, comprising:
- at least a content distribution server which stores and distributes content;
- a computer system; and
- a content receiving terminal which receives said content from said content distribution server, wherein said computer system including
- a content selection document generation part for generating a content selection document including content location information indicating a location of said contents, and
- a content selection document sending part for sending said content selection document to said content receiving terminal further comprising an encryption part for encrypting said content location information selectively and further comprising:
- a key sharing part for sharing a key used for encrypting said content location information with said content receiving terminal; and a billing part for billing a usage fee of said content specified by said content location information according to a key sharing history.

14. A content receiving terminal in a content distribution system comprising:
   at least a content distribution server which stores and distribute content;
   a computer system; and
   a content receiving terminal, said content receiving terminal including
   a content selection document receiving part for receiving content selection document including content location information from said computer system,
   an information extracting part for extracting said content location information from said content selection document,
   a distribution request sending part for sending a distribution request for said content specified by said content location information to said content distribution server, and
   a content receiving part for receiving said content from said content distribution server according to said distribution request.

15. The content receiving terminal as claimed in claim 14, said content receiving terminal further comprising a decoding part for decoding said content location information which is encrypted.

16. A content receiving terminal comprising:
   at least a content distribution server which stores and distribute content;
   a computer system; and
   a content receiving terminal, said content receiving terminal including
   a content selection document receiving part for receiving content selection document including content location information from said computer system,
   an information extracting part for extracting said content location information from said content selection document;
   a distribution request sending part for sending a distribution request for said content specified by said content location information to said content distribution server, and
   a content receiving part for receiving said content from said content distribution server according to said distribution request, wherein:
   said information extracting part extracts said content location information and location authentication information from said content selection document; and
   said content receiving terminal further comprises a validity verifying part for verifying validity of a location of said content on the basis of said location authentication information, and said distribution request sending part sends said distribution request when said location is verified to be valid.

17. The content receiving terminal as claimed in claim 16, further comprising a decoding part for decoding said content location information which is encrypted.

18. The content receiving terminal as claimed in claim 17, wherein:
   said information extracting part extracts encrypted data from said content selection document; and
   said decoding part decodes said content location information and said location authentication information by decoding said encrypted data.

* * * * *